(12) United States Patent
Shi et al.

(10) Patent No.: US 11,709,045 B1
(45) Date of Patent: Jul. 25, 2023

(54) SURFACE TEXTURE PROBE AND MEASUREMENT APPARATUS WITH A VIBRATIONAL MEMBRANE

(71) Applicant: National Institute of Metrology, China, Beijing (CN)

(72) Inventors: Yushu Shi, Beijing (CN); Shu Zhang, Beijing (CN); Zhoumiao Shi, Beijing (CN)

(73) Assignee: National Institute of Metrology, China, Beijing (CN)

( * ) Notice: Subject to any disclaimer, the term of this patent is extended or adjusted under 35 U.S.C. 154(b) by 0 days.

(21) Appl. No.: 17/676,139

(22) Filed: Feb. 19, 2022

(51) Int. Cl.
*G01B 5/28* (2006.01)
*G01B 5/00* (2006.01)

(52) U.S. Cl.
CPC ......... *G01B 5/0009* (2013.01); *G01B 5/0007* (2013.01); *G01B 5/28* (2013.01)

(58) Field of Classification Search
CPC ............................... G01B 5/28; G01B 5/0009
USPC .................................................... 33/533, 559
See application file for complete search history.

(56) References Cited

U.S. PATENT DOCUMENTS

| | | | | |
|---|---|---|---|---|
| 4,270,275 A * | 6/1981 | McMurtry | ............. | G01B 7/002 33/561 |
| 4,301,338 A * | 11/1981 | McMurtry | ............. | G01B 7/012 200/61.42 |
| 4,523,382 A * | 6/1985 | Werner | ................... | G01B 5/012 33/561 |
| 4,562,646 A * | 1/1986 | Dall'Aglio | ............. | G01B 7/012 33/561 |
| 4,731,934 A * | 3/1988 | Barnaby | ............... | G01B 5/0004 33/645 |
| 4,813,151 A * | 3/1989 | Hajdukiewicz | ........ | G01B 7/002 33/561 |
| 5,505,005 A * | 4/1996 | McMurtry | ............. | G01B 5/012 33/561 |
| 7,363,181 B2 * | 4/2008 | Katayama | ................ | G01B 5/28 702/167 |
| 8,756,973 B2 * | 6/2014 | Wallace | ............... | G01B 21/045 73/1.79 |
| 9,360,305 B2 * | 6/2016 | Lessing | ................ | G01B 9/0209 |
| 9,874,439 B2 * | 1/2018 | Bucher | ................ | G01B 11/303 |
| 11,193,749 B2 * | 12/2021 | Nakayama | ............... | G01B 5/28 |
| 11,435,174 B2 * | 9/2022 | Rudkowski | .......... | G01B 5/0004 |

(Continued)

*Primary Examiner* — George B Bennett
(74) *Attorney, Agent, or Firm* — Michael Best & Friedrich LLP

(57) ABSTRACT

A surface texture probe and a surface texture measurement apparatus with a vibrational membrane are provided. The probe includes a housing and a vibrational membrane, a stylus holder, a vertical guide assembly, a guide adjustment assembly and a stylus. An inner end of the vibrational membrane is attached to an upper end of the stylus holder. An outer end of the vibrational membrane is fixed to a vibrational membrane connection assembly fixedly connected to the housing. The vertical guide assembly is fixed inside the housing and slidably connected to the stylus holder and configured to guide the stylus holder to move in a vertical direction. The stylus is fixed to a lower end of the stylus holder. The guide adjustment assembly is mounted on the vertical guide assembly and configured to adjust a sliding friction force between the vertical guide assembly and the stylus holder.

20 Claims, 7 Drawing Sheets

(56) References Cited

U.S. PATENT DOCUMENTS

| | | | |
|---|---|---|---|
| 11,555,693 B2 * | 1/2023 | Sweers | G01B 5/18 |
| 2023/0052870 A1 * | 2/2023 | Morii | G01B 21/30 |

* cited by examiner

SURFACE TEXTURE PROBE AND MEASUREMENT APPARATUS WITH A VIBRATIONAL MEMBRANE

TECHNICAL FIELD

The present disclosure belongs to the field of surface texture measurement, in particular, to a surface texture measurement apparatus with a vibrational membrane, and in more particular, to a surface texture probe with a vibrational membrane.

BACKGROUND ART

In the traditional surface texture measurement apparatus, an object to be measured is placed on a positioning table, a stylus is operated to touch the surface of the object to be measured, and meanwhile the positioning table is moved so that the stylus and the measured object have a relative displacement to obtain the accumulated height data of surface texture, and in turn calculate surface characteristic parameters, such as roughness, waviness.

A typical surface texture measurement apparatus is divided into lever type measurement apparatus and vertical measurement apparatus according to the apparatus structure. The vertical surface texture measurement apparatus meets the Abbe's principle and has a smaller system error. Generally, the surface texture measurement apparatus includes three parts: a probing system, a movement control system and a frame. The probing system includes a stylus holder capable of moving vertically with the surface texture, a stylus and a sensor unit respectively arranged at both ends of the stylus holder. The stylus is configured to touch the surface of the object to be measured, and the sensor unit is configured to measure the vertical displacement of the stylus. The movement control system has a platform on which the measured object is installed, and a movement platform configured to produce relative movement between the stylus and the surface of the measured object. When the relative movement mechanism keeps the detector and the platform in contact with the surface of the stylus body, the probing system measures the vertical displacement of the stylus, and analyzes the surface texture of the object to be measured through the vertical displacement measured by the sensor unit.

In designing a vertical probing system, it is most important to control the movement posture and probing force of the stylus. In order to make the measurement results meet the Abbe's principle, the sensor unit, the stylus and the movement direction of the stylus are arranged on the same vertical line. However, excessive restraint may cause the stylus to respond too slowly, and the measurement results may be distorted, while insufficient restraint may cause the stylus to rotate and deflect, thereby causing undesirable measurement errors. Electromagnetic coils and air bearings are usually used to control the movement of the stylus holder. However, such structure may cause factors that are unfavorable to the measurement results, such as thermal noise or vibration noise. These noises may directly affect the measurement results. Especially in the field of nano-scale measurement, these deficiencies shall be avoided.

In view of the above, it is desirable to provide a low noise surface texture probe and measurement apparatus with a vibrational membrane, which has a structure capable of more accurately measuring surface texture and nano-scale features.

In the surface texture measurement apparatus disclosed herein, the probing system is provided with a vertical guide assembly based on a kinematic principle structure and a vibrational membrane structure to jointly control the movement posture and probing force of the stylus holder. The pure mechanical structure has less noise than the electrical equipment, which is also proved by experiments.

SUMMARY

The present embodiment aims to provide a surface texture probe and measurement apparatus with a vibrational membrane. The above-mentioned problems in the prior art are solved, noise is reduced during measuring, and the accuracy of surface texture measurement is improved.

In order to achieve the above objectives, the present disclosure provides the following solutions:

A surface texture probe with a vibrational membrane is provided by the present disclosure, and includes a housing and a vibrational membrane, a stylus holder, a vertical guide assembly, a guide adjustment assembly and a stylus which are arranged in the housing. An inner end of the vibrational membrane is attached to an upper end of the stylus holder, and an outer end of the vibrational membrane is fixed to a vibrational membrane connection assembly fixedly connected to the housing. The vertical guide assembly is fixed inside the housing and slidably connected to the stylus holder, and is configured to guide the stylus holder to move in a vertical direction. The stylus is fixed to a lower end of the stylus holder. The guide adjustment assembly is mounted on the vertical guide assembly and is configured to adjust a sliding friction force between the vertical guide assembly and the stylus holder.

In some embodiments, the vibrational membrane may be annular in shape, an inner edge of the vibrational membrane may be bonded to the upper end of the stylus holder with epoxy resin, and an outer edge of the vibrational membrane may be fixed to the vibrational membrane connection assembly.

In one embodiment, the vibrational membrane connection assembly may include a vibrational membrane holder fixed on a top of the housing and a vibration isolation ring fixed on the vibrational membrane holder via threaded holes and screws. The outer edge of the vibrational membrane may be fixed on the vibration isolation ring.

In one embodiment, the vertical guide assembly may include at least two V-groove blocks equally spaced around a periphery of the stylus holder and arranged oppositely, and a vertical guide bracket having wings extending vertically downward and matching spaces between adjacent V-groove blocks. The stylus holder may be provided with first V grooves along the vertical direction at positions of the stylus holder opposite to the at least two V-groove blocks. A plurality of first balls may be respectively rollably provided between the at least two V-groove blocks and the first V grooves. Lower ends of the at least two V-groove blocks may be provided with stops configured to prevent the plurality of first balls from sliding out of the first V grooves. The guide adjustment assembly may be mounted above the vertical guide bracket and may be configured to move the at least two V-groove blocks away from or close to the stylus holder.

In one embodiment, the guide adjustment assembly further includes a cam adjustment wheel, at least two positioning screws and at least two sliding blocks. The cam adjustment wheel may be arranged at a top of the vertical guide bracket, a flange which protrudes downwards may be provided in a center of the cam adjustment wheel and may be in transition fit with a center through hole of the vertical guide bracket. The at least two sliding blocks may be provided with first threaded holes and the at least two V-groove blocks may be provided with second threaded holes. The first threaded holes may be respectively aligned with the second threaded holes in the vertical direction. The cam adjustment wheel may be provided with arc elongated through holes at positions corresponding to positions of the first threaded holes. Radial elongated holes may be provided on the top of the vertical guide bracket. The at least two positioning screws may respectively pass through the arc elongated through holes, the radial elongated holes, the first threaded holes and the second threaded holes, to be threadedly connected to the at least two sliding blocks and the at least two V-groove blocks.

In one embodiment, opposite and adjacent side walls of any two adjacent wings of the wings may be provided with mounting grooves. The at least two sliding blocks each may be slidably mounted in the mounting grooves between corresponding two adjacent wings. At least one of the at least two sliding blocks may be provided with a horizontal guide through hole. The housing may be provided with first through holes which are aligned with the horizontal guide through hole, and a positioning pin may be inserted into the horizontal guide through hole and the first through holes.

Compared with the prior art, the present embodiment has the following technical effects: during measuring the surface texture of the specimen by the probe, the vertical guide assembly is configured to keep the stylus holder moving in the vertical direction, and the guide adjustment assembly is configured to adjust the sliding friction force between the vertical guide assembly and the stylus holder, so that the stylus holder slides smoothly relative to the vertical guide assembly, thereby ensuring that the stylus moves vertically up and down with the surface texture of the specimen and preventing the stylus from rotating and swinging. During this process, the vibrational membrane fixed on the upper end of the stylus absorbs and dissipates the noise generated by the up and down movement of the stylus, thereby significantly reducing the noise in the measuring process, avoiding the influence of the noise of the stylus vibration on the test results, and improving the accuracy of surface texture measurement.

A surface texture measurement apparatus with a vibrational membrane, is provided by the present disclosure, and includes a movement mechanism, an adjustment mechanism, a probing mechanism and a frame. The movement mechanism is arranged on a base plate of the frame and is configured to drive a stage to move relative to a probe adjustment assembly. The stage is fixedly provided on the movement mechanism and is configured for placing a specimen. The adjustment mechanism includes the probe adjustment assembly fixedly arranged on a kinematic bridge of the frame and configured to adjust a height of the probing mechanism in a vertical direction. The probing mechanism is fixed on the probe adjustment assembly, and includes a probe as provided in any one of the above embodiments and a sensing assembly. A part of the sensing assembly is fixed to the probe adjustment assembly and is configured to measure the displacement of the stylus.

In one embodiment, the movement mechanism may be a Y-axis driving assembly including a Y-axis motor fixed on the base plate, a Y-axis ball screw horizontally arranged along a Y axis and rotatably connected to the base plate, and a Y-axis sliding block sleeved threadedly on the Y-axis ball screw. An output shaft of the Y-axis motor may be fixedly connected to one end of the Y-axis ball screw.

In one embodiment, the adjustment mechanism further may include a specimen adjustment assembly being a Z1-axis adjustment assembly. The Z1-axis adjustment assembly may include a Z1-axis housing fixed on the Y-axis sliding block, a wedge block arranged in the Z1-axis housing, and a Z1-axis motor arranged at one end of the wedge block and configured to push the wedge block to move horizontally. An upper edge of the wedge block may be a first inclined edge, and a lower edge of the wedge block may be slidably connected to the Z1-axis housing. The stage may be provided at a lower end thereof with a second inclined edge matched with and slidably connected with the first inclined edge.

In one embodiment, second balls may be respectively rollably provided between the first inclined edge and the second inclined edge and between the lower edge of the wedge block and the Z1-axis housing.

In one embodiment, the probe adjustment assembly may include a Z2-axis adjustment assembly which includes a Z2-axis fixing plate fixed on the kinematic bridge, a Z2-axis sliding plate sleeved threadedly on a Z2-axis adjustment screw, and the Z2-axis adjustment screw rotatably connected to the Z2-axis fixing plate, the housing and the sensing assembly may be fixed on the Z2-axis sliding plate.

In one embodiment, the probe adjustment assembly further includes a Z3-axis adjustment assembly which includes a Z3-axis fixing plate fixedly connected to an upper portion of the Z2-axis sliding plate, a Z3-axis sliding plate slidably connected to the Z3-axis fixing plate, and a micrometer fixed to the Z3-axis sliding plate. An adjusting block may extend out of the Z3-axis fixing plate, an end of the micrometer may be abutted on the adjusting block, the part of the sensing assembly may be fixed on the Z3-axis sliding plate, and the housing may be fixed to a lower portion of the Z2-axis sliding plate.

In one embodiment, the Z3-axis adjustment assembly further includes a vertical guide plate having a part which is fixedly connected to the Z3-axis fixing plate via threaded holes and screws and an another part which is provided with a vertical elongated hole. A Z3-axis adjustment threaded hole may be provided on one side of the Z3-axis sliding plate and provided with a vertical guide screw capable of sliding in the vertical elongated hole.

In one embodiment, the Z3-axis adjustment assembly further includes a first sliding bar fixedly connected to the Z3-axis fixing plate, a second sliding bar fixedly connected to the Z3-axis sliding plate, and a spring each with an upper end fixed to an upper end of the Z3-axis sliding plate and a lower end fixed to a lower end of the Z3-axis fixing plate. Second V grooves may be provided between a side wall of the first sliding bar and a side wall of the second sliding bar facing the side wall of the first sliding bar. Third balls may be provided in the second V grooves, evenly embedded on and capable of rolling with respect to a ball holder, and rollably connected to the first sliding bar and the second sliding bar.

In one embodiment, wherein the sensing assembly may include a sensing plate fixed to the upper end of the stylus support, and a displacement sensor fixed on the Z3-axis sliding plate via a sensor holder and configured to measure the displacement of the sensing plate. Vertical axes of the sensing plate, the stylus holder and the stylus may be collinear.

In one embodiment, the Z3-axis fixing plate may be fixed on an upper portion of an adapter plate, the housing may be fixed on a lower portion of the adapter plate, and the adapter plate may be fixed on the Z2-axis sliding plate.

In one embodiment, the surface texture measurement apparatus further includes a controller communicated with a computer and configured to send a control signal to the movement mechanism, the controller may include a signal processor configured to receive and process a displacement signal sensed by the displacement sensor.

In one embodiment, the frame may include the base plate, two wing blocks and the kinematic bridge. The two wing blocks may be symmetrically arranged on both sides of one end of the kinematic bridge and fixed on the base plate, ball grooves may be provided on lower portions of the two wing blocks and a lower portion of an another end of the kinematic bridge, three fourth balls may be mounted on the base plate and assembled in and in point contact with the ball grooves separately; the kinematic bridge may be provided with a groove in which the probe adjustment assembly is fixedly arranged via threaded holes.

Compared with the prior art, the present embodiment has the following technical effects: during measuring the surface texture of the specimen, the vertical guide assembly can keep the stylus holder moving in the vertical direction, and the guide adjustment assembly can keep the stylus holder sliding smoothly relative to the vertical guide assembly. The specimen is drove by the movement mechanism to move at a speed, while the stylus moves vertically up and down with the surface texture of the specimen without rotating and swinging. The sensing plate, the stylus holder, and the stylus move up and down together. The displacement sensor measures the displacement of the sensing plate, and then realizes the measuring of the surface texture of the specimen in terms of structure. In this process, the vibrational membrane fixed on the upper end of the stylus absorbs the noise generated by the up and down movement of the stylus, thereby significantly reducing the noise in the measuring process, avoiding the influence of the noise of the stylus vibration on the test results, and improving the accuracy of surface texture measurement.

BRIEF DESCRIPTION OF THE DRAWINGS

In order to more clearly illustrate the embodiments of the disclosure or the technical solutions in the prior art, the drawings required in the embodiments will be briefly described below, it is apparent that the drawings in the following description are only some embodiments of the disclosure, for those skilled in the art, other drawings can be obtained according to the drawings without creative labors.

Figure 1:
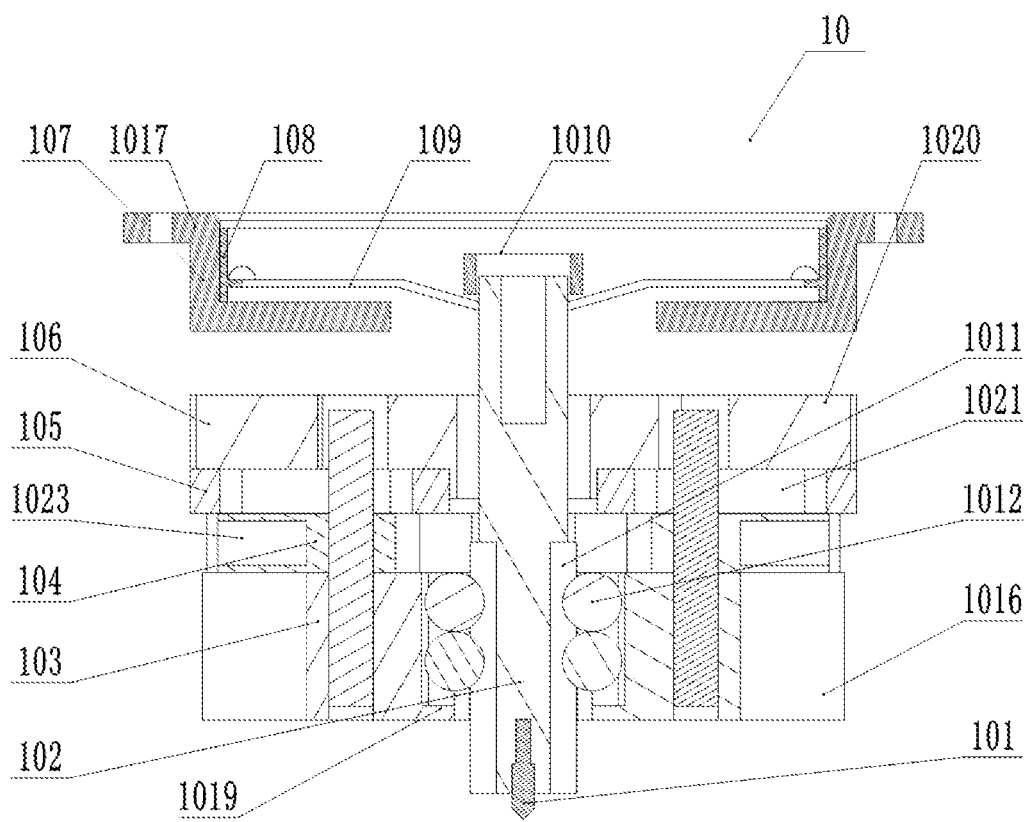
FIG. 1 is a cross-sectional view of a surface texture probe with a vibrational membrane according to the present disclosure.

List of reference numerals: 10 probe, 101 stylus, 102 stylus holder, 103 V-groove block, 104-sliding block, 105 vertical guide bracket, 106 guide adjustment assembly, 107 vibrational membrane holder, 108 vibration isolation ring, 109 vibrational membrane, 1010 sensing plate, 1011 V groove, 1012 first ball, 1013 positioning screw, 1014 arc elongated through hole, 1015 housing, 1016 vertical guide assembly, 1017 vibrational membrane connection assembly, 1018 wing, 1019 stop, 1020 cam adjustment wheel, 1021 radial elongated hole, 1022 mounting groove, 1023 horizontal guide through hole; 1 probing mechanism, 2 movement mechanism, 20 Y-axis driving assembly, 201 Y-axis motor, 202 Y-axis sliding block, 203 Y-axis guide rail, 30 frame, 31 kinematic bridge, 32 wing block, 33 ball groove, 34 fourth ball, 35 threaded hole, 36 groove, 37 counterweight, 38 base plate, 4 adjustment mechanism, 40 probe adjustment assembly, 41 specimen adjustment assembly, 411 Z1-axis adjustment assembly, 42 Z2-axis adjustment assembly, 4201 Z2-axis adjustment screw, 4202 Z2-axis fixing plate, 43 Z3-axis adjustment assembly, 4301 adapter plate, 4302 micrometer, 4303 Z3-axis fixing plate, 4304 Z3-axis sliding plate, 4305 adjusting block, 4306 vertical guide plate, 4307 first sliding bar, 4308 second sliding bar, 4309 spring, 50 sensing assembly, 51 displacement sensor, 52 sensor holder, 60-stage.

DETAILED DESCRIPTION OF THE EMBODIMENTS

The technical solutions in the embodiments of the present disclosure will be clearly and completely described below combining with the accompanying drawings in the embodiments of the present disclosure, and it is obvious that the embodiments described are only a part rather than all of the embodiments of the present disclosure. All other embodiments, which are obtained by those skilled in the art based on the embodiments of the present disclosure without creative labors, shall fall within the protection scope of the present disclosure.

In order to make the above purposes, features and advantages of the present disclosure more comprehensible, the present disclosure is further and described in detail combining with the accompanying drawings and specific embodiments thereof.

Embodiment I

Figure 2:
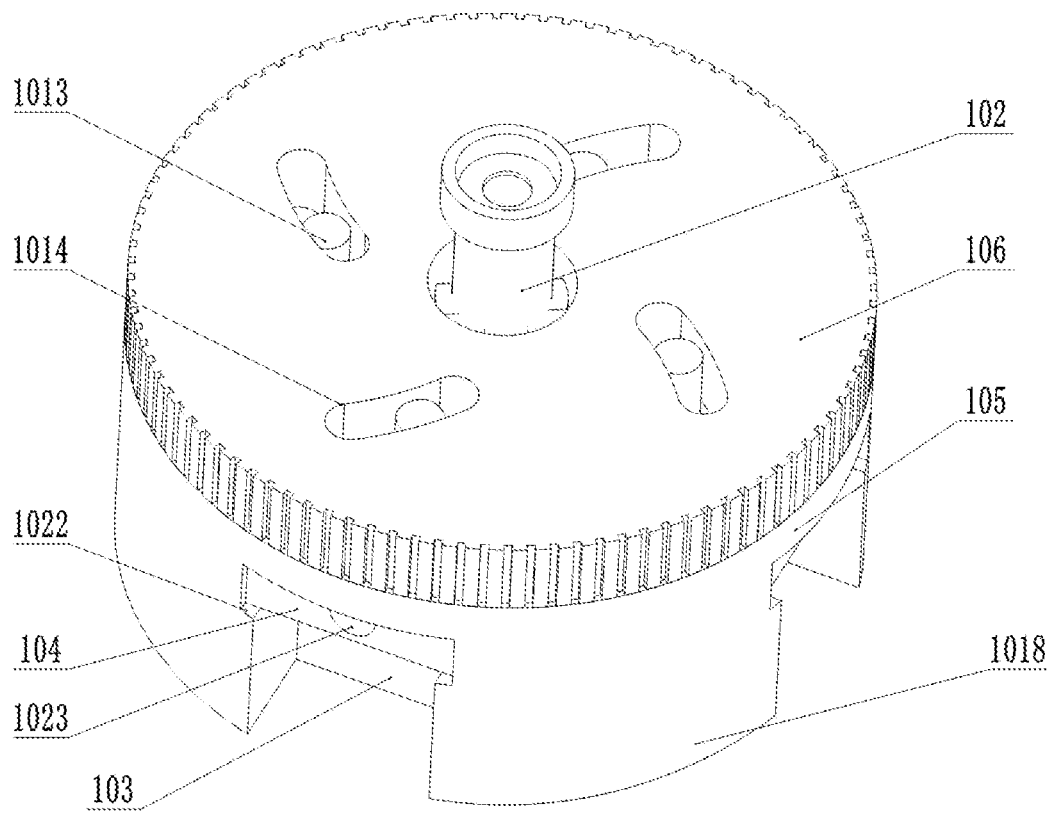
FIG. 2 is a perspective view of a part of the surface texture probe with a vibrational membrane according to the present disclosure.
Figure 3:
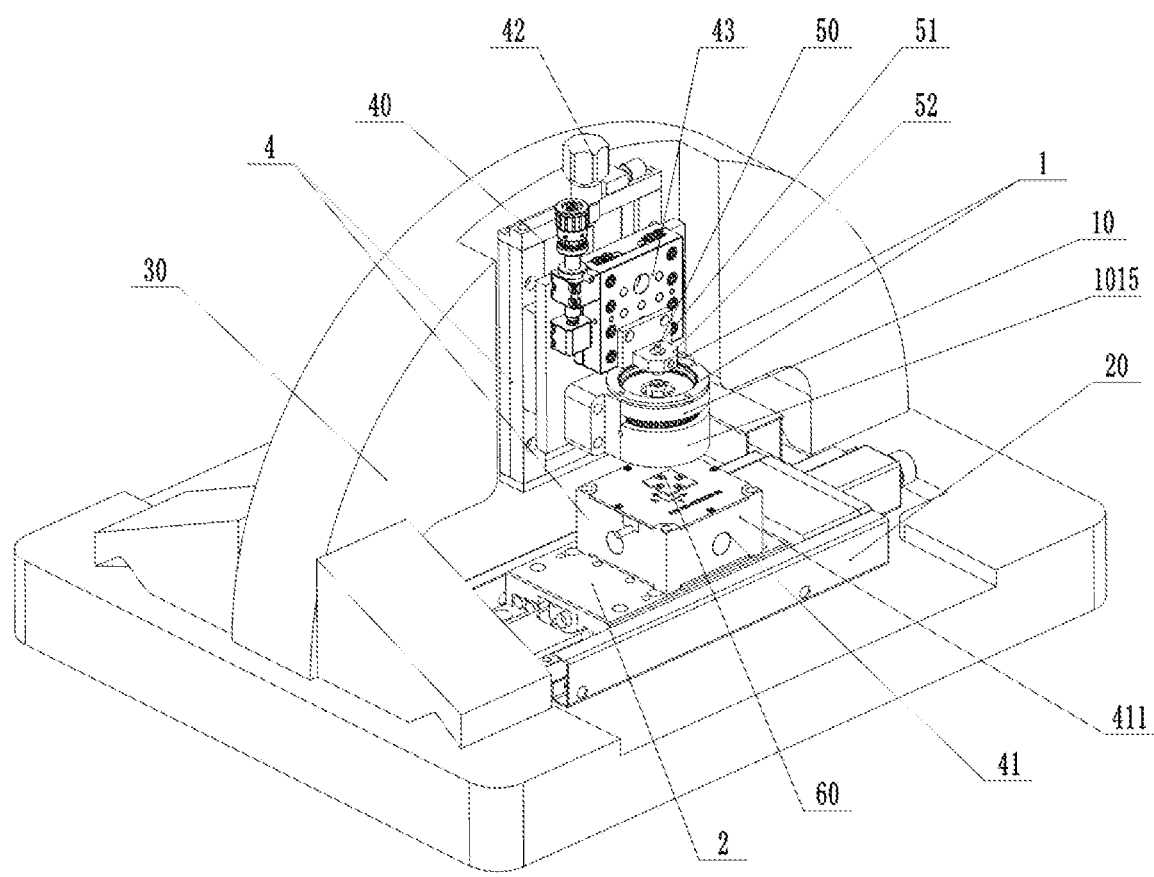
FIG. 3 is a perspective view of a surface texture measurement apparatus with a vibrational membrane according to the present disclosure.
Figure 4:
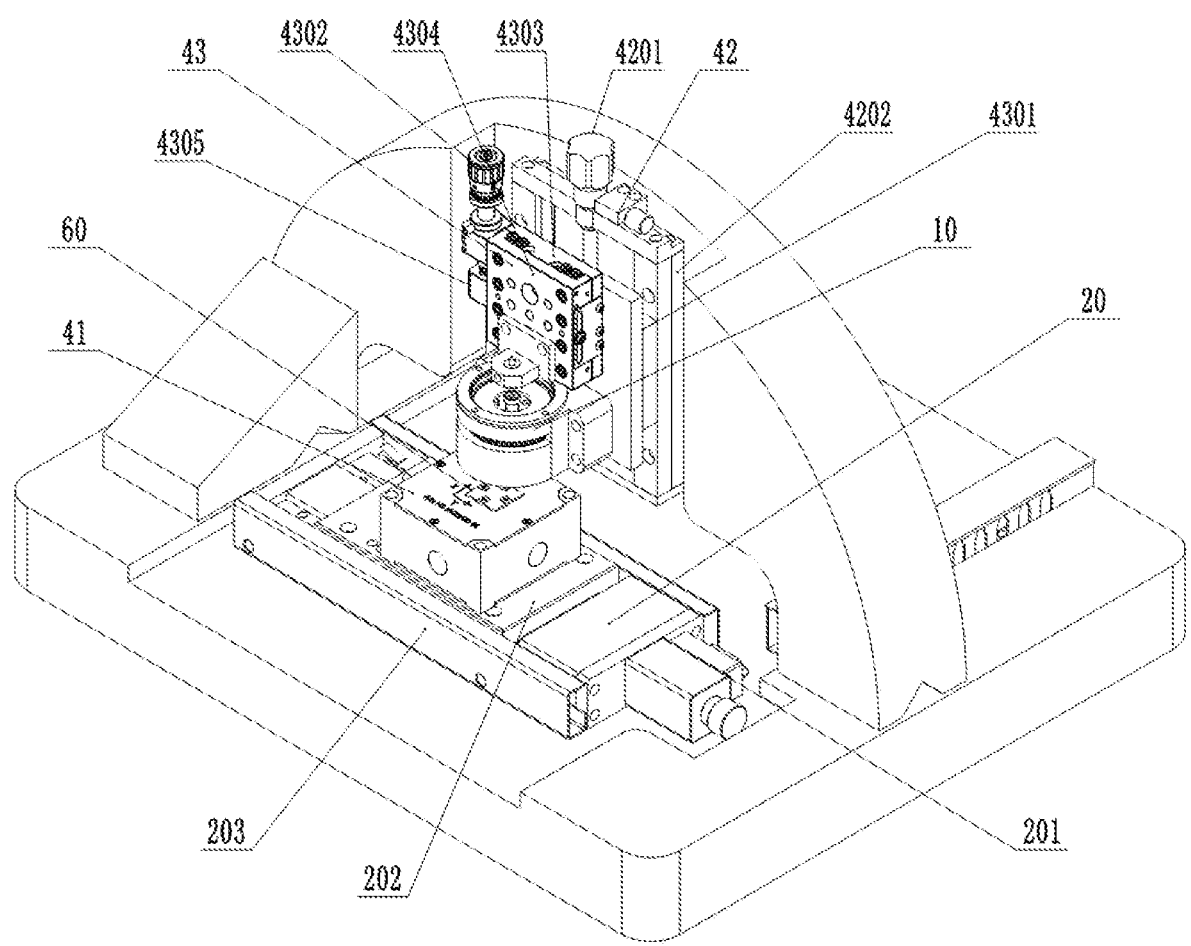
FIG. 4 is another perspective view of the surface texture measurement apparatus with the vibrational membrane according to the present disclosure.
Figure 5:
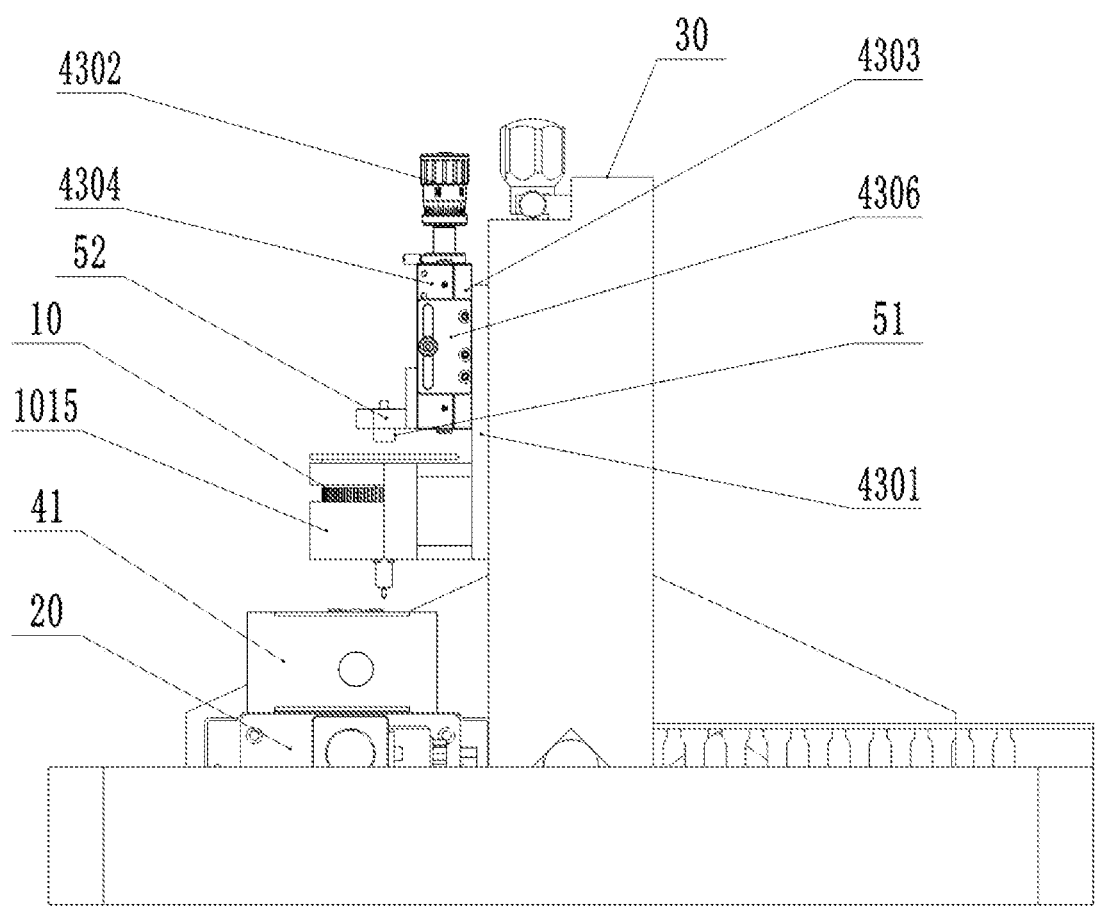
FIG. 5 is a right view of the surface texture measurement apparatus with a vibrational membrane according to the present disclosure.
Figure 6:
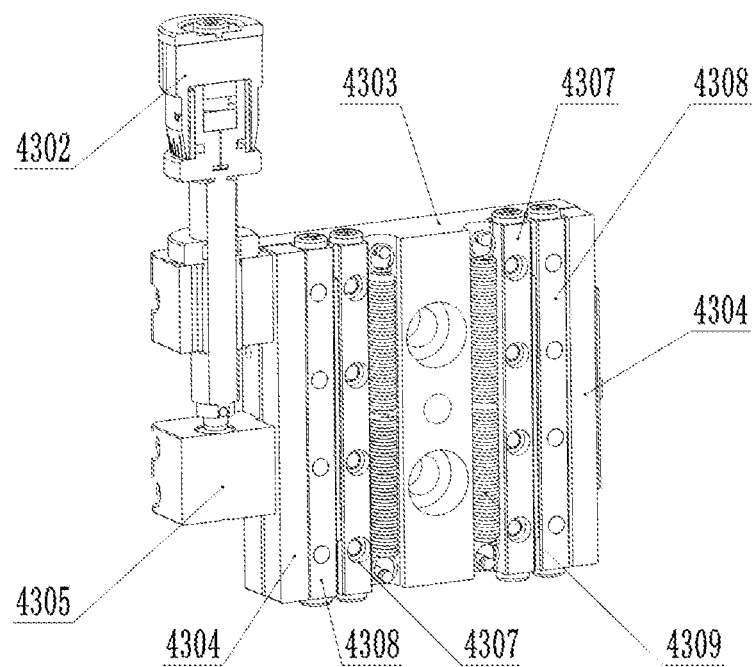
FIG. 6 is a cross-sectional view of a Z2-axis adjustment assembly according to the present disclosure.
Figure 7:
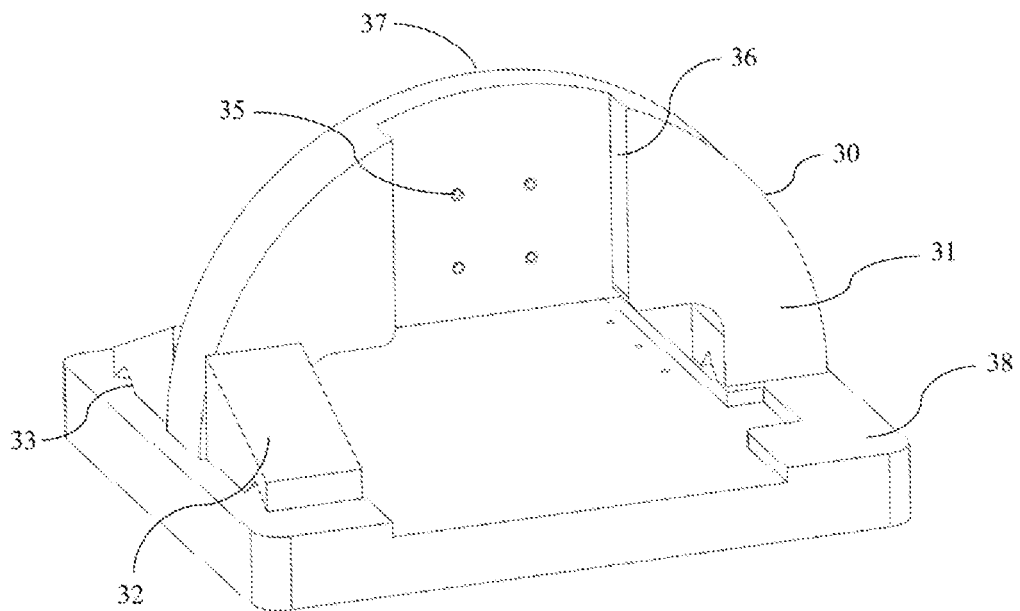
FIG. 7 is a perspective view of a frame according to the present disclosure.
Figure 8:
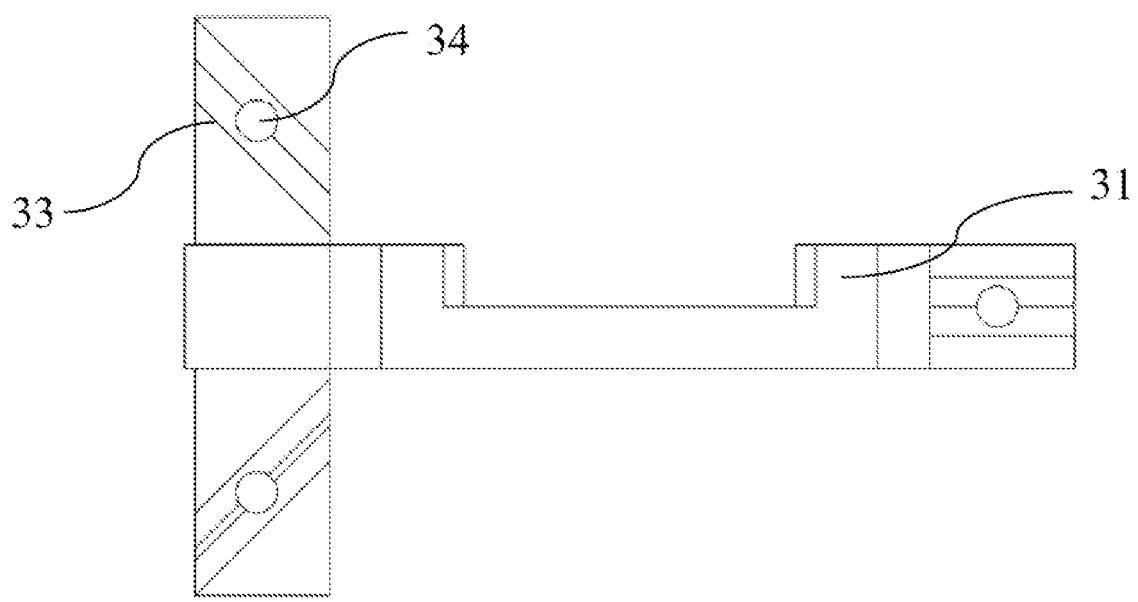
FIG. 8 is a top view of a kinematic bridge and wing blocks according to the present disclosure.

As shown in FIGS. 1-2: the present embodiment provides a surface texture probe 10 with a vibrational membrane, which includes a housing 1015, and a vibrational membrane 109, a stylus holder 102, a vertical guide assembly 1016, a guide adjustment assembly 106 and the stylus 101 which are arranged in the housing 1015. An inner end of the vibrational membrane 109 is attached to an upper end of the stylus holder 102, and an outer end of the vibrational membrane 109 is fixed to a vibrational membrane connection assembly 1017 fixedly connected to the housing 1015. The vertical guide assembly 1016 is fixed inside the housing 1015 and slidably connected to the stylus holder 102. The vertical guide assembly 1016 sleeves on the stylus holder 102 and is configured to guide the stylus holder 102 to move in a vertical direction. The stylus 101 is fixed to a lower end of the stylus holder 102. The guide adjustment assembly 106 sleeves on the stylus holder 102 and is installed on the vertical guide assembly, and is configured to adjust a sliding friction force between the vertical guide assembly and the stylus holder 102. During measuring the surface texture of the specimen by the probe 10, the vertical guide assembly can keep the stylus holder 102 moving in the vertical direction, and the guide adjustment assembly 106 can adjust the sliding friction force between the vertical guide assembly and the stylus holder 102, so that the stylus holder 102 slides smoothly with relative to the vertical guide assembly, thereby ensuring that the stylus 101 moves vertically up and down with the surface texture of the specimen and preventing the stylus 101 from rotating and swinging. During this process, the vibrational membrane 109 fixed on the upper end of a stylus holder 102 absorbs the noise generated by the up and down movement of the stylus 101, thereby significantly reducing the noise in the measuring process, avoiding the influence of the noise of the stylus vibration on the test results, and improving the accuracy of surface texture measurement.

In a particular embodiment, the vibrational membrane 109 may be circular, an inner edge of the vibrational membrane 109 is bonded to the upper end of the stylus holder 102 by epoxy resin, and an outer edge of the vibrational membrane 109 is fixed to the vibrational membrane connection assembly. Particularly, the epoxy resin is a phenolic epoxy resin, which has strong adhesion and is not easy to change with temperature, and which is very suitable for a nano-scale measurement instrument with low noise.

In a particular embodiment, the vibrational membrane connection assembly may include a vibrational membrane holder 107 fixed on a top of the housing 1015 and a vibration isolation ring 108 fixed on the vibrational membrane holder 107. The outer edge of the vibrational membrane 109 is fixed on the vibration isolation ring 108. Preferably, the vibration isolation ring 108 is fixed on the vibrational membrane support 107 via threaded holes and screws. Preferably, the vibrational membrane holder 107 is fixed on the top of the housing 1015 via threaded holes and screws. Since the vibrational membrane 109 generally has a certain degree of flexibility, the vibrational membrane 109 is supported by the vibration isolation ring 108, and the vibration isolation ring 108 is fixed to the housing 1015 via the vibrational membrane holder 107.

In a particular embodiment, the vertical guide assembly includes at least two V-groove blocks 103 and a vertical guide bracket 105. At least two V-groove blocks 103 are equally spaced around a periphery of the stylus holder 102 and arranged opposite to each other, preferably, there are four V-groove blocks 103 spaced at 90 degrees. The vertical guide bracket 105 is fixed inside the housing 1015. The vertical guide bracket 105 has four wings 1018 extending vertically downward and matching spaces between adjacent V-groove blocks 103. The stylus holder 102 is provided with first V grooves 1011 along the vertical direction at positions of the stylus holder 102 which is opposite to the V-groove blocks 103. A plurality of first balls 1012 are respectively rollably provided between the V-groove blocks 103 and the first V grooves 1011. Lower ends of the V-groove blocks 103 is provided with stops 1019 configured to prevent the plurality of first balls 1012 from sliding out of the first V grooves 1011. The guide adjustment assembly is mounted above the vertical guide bracket 105 and configured to move the four V-groove blocks 103 away from or close to the stylus holder 102. The first balls 1012 are always in point contact with the V-groove blocks 103 and the first V grooves 1011 of the stylus holder 102. The four V-groove blocks 103 limit the five degrees of freedom of the stylus holder 102, so that the stylus holder 102 only moves in the vertical direction.

In a particular embodiment, the guide adjustment assembly 106 may further include a cam adjustment wheel 1020, four positioning screws 1013 and four sliding blocks 104. The cam adjustment wheel 1020 is arranged on a top of the vertical guide bracket 105, a flange which protrudes downwards is provided in a center of the cam adjustment wheel 1020 and in transition fit with a center through hole of the vertical guide bracket 105, such that it is sufficient to provide sufficient friction for preventing the vertical guide brackets 105 from loosening. The four sliding blocks 104 are provided with first threaded holes and the four V-groove blocks 103 are provided with second threaded holes. The first and second threaded holes are all aligned in the vertical direction. The cam adjustment wheel is provided with an arc elongated through holes 1014 at positions corresponding to positions of the first threaded hole and the second threaded holes. The top of the vertical guide brackets 105 are provided with radial elongated holes 1021 in a radial direction. Each positioning screw 1013 respectively passes through the arc elongated through holes 1014, the radial elongated holes, the first threaded holes and the second threaded holes, to be threadedly connected to the sliding blocks 104 and the V-shaped groove blocks 103. Through the design of the cam adjusting wheel, such as by rotating the cam adjusting wheel clockwise, the positioning screws 1013 are close to a center of the cam adjusting wheel, and the sliding blocks 104 and the V-groove blocks 103 move in a direction close to the center, so as to adjust the friction force between the sliding blocks 104 and the V-groove blocks 103, thereby ensuring that the stylus holder 102 moves up and down smoothly and preventing it from rotating and swinging.

In a particular embodiment, opposite and adjacent side walls of any two adjacent wings of the wings are provided with mounting grooves 1022, and the four sliding blocks 104 are slidably mounted in the mounting grooves between corresponding two adjacent wings. At least one of the four sliding blocks 104 is provided with a horizontal guide through hole 1023, the housing 1015 are provided with first through holes which are aligned with the horizontal guide through hole, and a positioning pin may be inserted into the horizontal guide through hole and the first through holes. It is further restricted that the sliding blocks 104 and the V-groove blocks 103 only move in the horizontal direction.

Embodiment II

As shown in FIGS. 3-8, the present embodiment also provides a surface texture measurement apparatus with a vibrational membrane, which includes a movement mechanism 2, an adjustment mechanism 4, a probing mechanism 1 and a frame 30. The movement mechanism is arranged on a base plate of the frame 30 and configured to drive the stage 60 to move relative to a probe adjustment assembly 40. The stage 60 is fixed above the movement mechanism. The stage 60 is configured to place a specimen, and the movement mechanism is configured to drive the stage 60 moves. The adjustment mechanism 4 includes the probe adjustment assembly 40 fixedly arranged on a kinematic bridge 31 of the frame 30 and configured to adjust a height of the probing mechanism in a vertical direction. The probing mechanism is fixed on the probe adjustment assembly 40 and includes a probe 10 as provided in the above embodiment I and a sensing assembly 50. A part of the sensing assembly is fixed on the probe adjustment assembly and is configured to measure the displacement of the stylus 101.

During measuring the surface texture of the specimen, the vertical guide assembly can guide the stylus holder 102 to move in the vertical direction, and the guide adjustment assembly 106 can allow the stylus holder 102 to slide smoothly relative to the vertical guide assembly. The specimen is carried by the movement mechanism to move at a speed, while the stylus 101 moves vertically up and down with the surface texture of the specimen without rotating and swinging. The sensing plate 1010, the stylus holder 102, and the stylus 101 move up and down together. The displacement sensor 51 measures the displacement of the sensing plate 1010, and then realizes the measuring of the surface texture of the specimen in terms of structure. In this process, the vibrational membrane 109 fixed on the upper end of the stylus holder 102 absorbs the noise generated by the up and down movement of the stylus 101, thereby significantly reducing the noise in the measuring process, avoiding the influence of the noise of the stylus vibration on the test results, and improving the accuracy of surface texture measurement.

In a particular embodiment, the movement mechanism may be a Y-axis driving assembly 20, or preferably may include an X-axis driving assembly for driving the specimen to move in the X-axis direction. The Y-axis driving assembly 20 includes a Y-axis motor 201, a Y-axis ball screw and a Y-axis sliding block 202. The Y-axis ball screw is arranged horizontally along the Y axis and is rotatably connected to the base plate 38. The Y-axis sliding block 202 is sleeved threadedly on the Y-axis ball screw. The Y-axis motor 201 has an output shaft fixedly connected to one end of the Y-axis ball screw, and the Y-axis motor 201 is fixed on the base plate 38. The output shaft of the Y-axis motor 201 drives the Y-axis ball screw to rotate, which in turn drives the Y-axis sliding block 202 to move along the Y axis, thereby realizing the movement of the specimen relative to the stylus 101 during measuring. In a preferred embodiment, the Y-axis driving assembly 20 further includes a Y-axis guide rail 203, and the Y-axis guide rail 203 is provided with two guide rails along the Y axis for guiding the Y-axis sliding block 202 to move linearly along the Y axis. In a preferred embodiment, the model number of the Y-axis driving assembly 20 is ETS-100RG.

In a particular embodiment, the adjustment mechanism 4 also includes a specimen adjustment assembly 41 being a Z1-axis adjustment assembly 411. The Z1-axis adjustment assembly 411 includes a Z1-axis housing, a wedge block and a Z1-axis motor. The Z1-axis housing is fixed on the Y-axis sliding block 202. The wedge block is arranged in the Z1-axis housing, an upper edge of the wedge block is a first inclined edge, a lower edge of the wedge block is slidably connected with the Z1-axis housing. The stage may be provided at a lower end thereof with a second inclined edge matched with and slidably connected with the first inclined edge. The Z1axis motor is arranged at one end of the wedge block and is configured to push the wedge block to move horizontally. Preferably, for example, a rotation motion of the Z1-axis motor is converted into a linear motion via a gear rack mechanism to push the wedge block to move horizontally, and then realize the vertical lifting of the stage 60, and realize the height adjustment of the specimen. In a preferred embodiment, the Z1-axis adjustment assembly 411 can be manually adjusted, that is, the wedge block is directly pushed by a means similar to a micrometer 4302 of the Z3-axis adjustment assembly 43 to move horizontally to achieve adjustment. In a preferred embodiment, the model number of the Z1-axis adjustment assembly 411 is NS-XY25Z20-01.

In a particular embodiment, second balls may be rollably provided between the first inclined edge and the second inclined edge and between the lower edge of the wedge block and the Z1-axis housing. It is ensured that the smooth sliding between the wedge block and the stage 60 and the Z1-axis housing is achieved, and the resistance and wear of the movement of the wedge block are reduced.

In a particular embodiment, the probe adjustment assembly may include a Z2-axis adjustment assembly 42, which includes a Z2-axis fixing plate 4202, a Z2-axis sliding plate and a Z2-axis adjustment screw 4201. The Z2-axis fixing plate 4202 is fixed on the kinematic bridge 31, the Z2-axis adjustment screw 4201 is rotatably connected with the Z2-axis fixing plate 4202, the Z2-axis sliding plate is sleeved threadedly on the Z2-axis adjusting screw 4201, and the housing 1015 and the sensing assembly are fixed on the Z2-axis sliding plate. The Z2-axis adjustment screw 4201 is manually rotated, and the Z2-axis sliding plate moves along the Z2-axis adjustment screw 4201, thereby realizing the up and down adjustment of the probe 10 and the displacement sensor 51. Preferably, the Z2-axis adjustment assembly 42 is configured to roughly adjust the vertical distance between the probe 10 and the specimen. In a preferred embodiment, the model number of the Z2-axis adjustment assembly 42 is MTSS-75.

In a particular embodiment, the probe adjustment assembly further includes a Z3-axis adjustment assembly 43, which includes a Z3-axis fixing plate 4303, a Z3-axis sliding plate 4304 and a micrometer 4302. The Z3-axis fixing plate 4303 is fixedly connected to an upper portion of the Z2-axis sliding plate, the Z3-axis sliding plate 4304 and the Z3-axis fixing plate 4303 are slidably connected. The shell of the micrometer 4302 is fixed to the Z3-axis sliding plate 4304. An adjusting block 4305 extends from the Z3-axis fixing plate 4303, and an end of the micrometer 4302 is abutted on the adjusting block 4305, the part of the sensing assembly is fixed on the Z3-axis sliding plate 4304, and the housing 1015 is fixed on a lower portion of the Z2-axis sliding plate. Preferably, the Z3-axis fixing plate 4303 is fixed on an upper portion of the adapter plate 4301, the housing 1015 is fixed on a lower portion of the adapter plate 4301 fixed on the Z2-axis sliding plate. Preferably, the sensing assembly includes a sensing plate 1010 and the displacement sensor 51. The sensing plate 1010 is fixed on the upper end of the stylus holder 102. The displacement sensor 51 is fixed on the Z3-axis sliding plate 4304 via the sensor holder 52. The displacement sensor 51 is configured for measuring the displacement of the sensing plate 1010, the vertical axes of the sensing plate 1010, the stylus holder 102 and the stylus 101 are collinear. Preferably, a rolling ball is connected to the end of the micrometer 4302, specifically, the rolling ball is embedded at the end of the micrometer 4302 and is in point contact with the adjusting block 4305. The micrometer 4302 is rotated manually, the rolling ball is against the adjusting block 4305, realizing the up and down movement of the Z3-axis sliding plate 4304, and in turn realizing the fine adjustment of the distance between the displacement sensor 51 and the probe 10, so that the sensing plate 1010 can enter an measurable area of the displacement sensor 51.

In a particular embodiment, the Z3 axis adjustment assembly 43 may further include a vertical guide plate 4306. A part of the vertical guide plate 4306 is fixedly connected to the Z3-axis fixing plate 4303 via threaded holes and screws. The other part of the vertical guide plate 4306 is provided with a vertical elongated hole. A Z3-axis adjustment threaded hole is provided in one side of the Z3-axis sliding plate 4304 and connected with a vertical guide screw capable of sliding in the vertical elongated hole. With this arrangement, it can be ensured that the Z3-axis sliding plate 4304 only moves up and down vertically.

In a particular embodiment, the Z3-axis adjustment assembly 43 further includes a first sliding bar 4307, a second sliding bar 4308, and a spring 4309. The first sliding bar 4307 is fixedly connected to the Z3-axis fixing plate 4303, and the second sliding bar 4308 is fixedly connected to the Z3-axis sliding plate 4304. Second V grooves are provided between a side wall of the first sliding bar 4307 and a side wall of the second sliding bar 4308 facing the side wall of the first sliding bar 4307. Third balls are provided in the second V grooves, evenly embedded in a ball holder which is arranged in the second V grooves in the vertical direction and separated from the sliding bars, and rollably connected to the first sliding bar 4307 and the second sliding bar 4308. An upper end of the spring 4309 is fixed to an upper end of the Z3-axis sliding plate 4304, and a lower end of the spring 4309 is fixed to a lower end of the Z3-axis fixing plate 4303. The third balls 34 are always in point contact with the Z3-axis fixing plate 4303 and the Z3-axis sliding plate 4304 to ensure smooth sliding between the Z3-axis fixing plate 4303 and the Z3-axis sliding plate 4304. Preferably, the spring 4309 can be in a compressed state, the Z3-axis sliding plate 4304 is in a fixed position under the action of the gravity of the Z3-axis sliding plate 4304 and the elastic force of the spring 4309 after being adjusted to a certain height. If the displacement sensor 51 is required to be adjusted upward, the elastic force of the spring 4309 also facilitates the upward adjustment of the Z3-axis sliding plate 4304.

In a particular embodiment, the surface texture measurement apparatus further includes a controller, which is in communication connection with a computer. The controller is configured to send a control signal to the movement mechanism, particularly to the Y-axis motor, so as to control adjust the Y-axis movement of the specimen as required. The controller includes a signal processor, which is configured to receive and process the displacement signal sensed by the displacement sensor 51 and then send the processed signal to the computer.

In a particular embodiment, the frame 30 may include a base plate 38, two wing blocks 32 and a kinematic bridge 31. The two wing blocks 32 are symmetrically arranged on both sides of one end of the kinematic bridge 31 and fixed on the base plate 38. The base plate 38 is provided at two sides thereof, with three ball grooves which are equipped with three fourth balls 34 one by one. Ball grooves 33 are provided on lower portions of the two wing blocks and a lower portion of the other end of the kinematic bridge 31. The fourth balls 34 are mounted on the base plate 38 and in point contact with the ball grooves 33. The kinematic bridge 31 is provided with a groove 36 in which the probe adjustment assembly is fixedly arranged via threaded holes 35. Particularly, the Z2-axis fixing plate 4202 is fixed in the groove 36 via screws and threaded holes. Preferably, the two wing blocks 32 and the kinematic bridge 31 are fixed to each other in an interference fit manner, and are further fixed together by the cooperation of the fourth balls 34 and the ball grooves 33. The two wing blocks 32 and the kinematic bridge 31 are fixed on the base plate 38, and the fourth balls 34 are in point contact with the V-shaped ball grooves 33 of the kinematic bridge 31 and the wing blocks 32, and the weight of the entire frame 30 is carried by these contact points. In the case, although the kinematic bridge 31/two wing blocks 32 can slide through the fourth balls 34, the positions of the kinematic bridge 31 and two wing blocks 32 are fixed after assembly. Therefore, the fourth balls 34 are required to be made of very strong material, preferably zirconium dioxide. The center of gravity of the triangle formed by the centers of the three fourth balls 34 is just below the center of gravity of the kinematic bridge 31 to provide more stability. Preferably, the kinematic bridge 31 may be a gantry structure.

Preferably, the counterweight 37 is suspended on the back of the kinematic bridge 31 to reduce the deformation of the kinematic bridge 31 caused by the weight of the probing mechanism and to ensure that the entire probing mechanism is installed vertically.

In a particular embodiment, the probe 10 in this embodiment can be the same as any preferred embodiment in the embodiment I.

The principle and the implementation mode of the present disclosure are explained by using specific examples in the present specification, and the above description of the embodiments is only used to help understand the method and the core idea of the present disclosure; meanwhile, for a person skilled in the art, it may be changed in the specific embodiments and the application range according to the idea of the present disclosure. In conclusion, the contents of the description should not be construed as limitations on the disclosure.

What is claimed is:

1. A surface texture probe with a vibrational membrane, comprising:
   a housing;
   a vibrational membrane arranged in the housing, an inner end of the vibrational membrane being attached to an upper end of a stylus holder, and an outer end of the vibrational membrane being fixed to a vibrational membrane connection assembly fixedly connected to the housing;
   the stylus holder arranged in the housing;
   a stylus arranged in the housing and fixed to a lower end of the stylus holder;
   a vertical guide assembly arranged in the housing, the vertical guide assembly being fixed inside the housing, slidably connected to the stylus holder, and configured to guide the stylus holder to move in a vertical direction; and
   a guide adjustment assembly arranged in the housing, the guide adjustment assembly being mounted on the vertical guide assembly and configured to adjust a sliding friction force between the vertical guide assembly and the stylus holder.

2. The surface texture probe of claim 1, wherein the vibrational membrane is annular in shape, an inner edge of the vibrational membrane is bonded to the upper end of the stylus holder with epoxy resin, and an outer edge of the vibrational membrane is fixed to the vibrational membrane connection assembly.

3. The surface texture probe of claim 2, wherein the vibrational membrane connection assembly comprises:
   a vibrational membrane holder fixed on a top of the housing; and
   a vibration isolation ring fixed on the vibrational membrane holder via threaded holes and screws, the outer edge of the vibrational membrane being fixed on the vibration isolation ring.

4. The surface texture probe of claim 1, wherein the vertical guide assembly comprises:
   at least two V-groove blocks equally spaced around a periphery of the stylus holder and arranged oppositely; and a vertical guide bracket having wings extending vertically downward and matching spaces between adjacent V-groove blocks;

wherein, the stylus holder is provided with first V grooves along the vertical direction at positions of the stylus holder opposite to the at least two V-groove blocks, a plurality of first balls are respectively rollably provided between the at least two V-groove blocks and the first V grooves; lower ends of the at least two V-groove blocks are provided with stops configured to prevent the plurality of first balls from sliding out of the first V grooves; and the guide adjustment assembly is mounted above the vertical guide bracket and is configured to move the at least two V-groove blocks away from or close to the stylus holder.

5. The surface texture probe of claim 4, wherein the guide adjustment assembly further comprises:

a cam adjustment wheel arranged at a top of the vertical guide bracket, wherein, a flange which protrudes downwards is provided in a center of the cam adjustment wheel and is in transition fit with a center through hole of the vertical guide bracket;

at least two sliding blocks provided with first threaded holes, and wherein the at least two V-groove blocks are provided with second threaded holes, the first threaded holes are respectively aligned with the second threaded holes in the vertical direction; the cam adjustment wheel is provided with arc elongated through holes at positions corresponding to positions of the first threaded holes; radial elongated holes are provided on the top of the vertical guide bracket; and at least two positioning screws respectively passing through the arc elongated through holes, the radial elongated holes, the first threaded holes and the second threaded holes, to be threadedly connected to the at least two sliding blocks and the at least two V-groove blocks.

6. The surface texture probe of claim 5, wherein opposite and adjacent side walls of any two adjacent wings of the wings are provided with mounting grooves, the at least two sliding blocks each are slidably mounted in the mounting grooves between corresponding two adjacent wings, at least one of the at least two sliding blocks is provided with a horizontal guide through hole; the housing are provided with first through holes which are aligned with the horizontal guide through hole, and a positioning pin is inserted into the horizontal guide through hole and the first through holes.

7. A surface texture measurement apparatus with a vibrational membrane, comprising:

a frame;

a movement mechanism arranged on a base plate of the frame and configured to drive a stage to move relative to a probe adjustment assembly, wherein the stage is fixedly provided on the movement mechanism and is configured for placing a specimen;

an adjustment mechanism comprising the probe adjustment assembly which is fixedly arranged on a kinematic bridge of the frame and configured to adjust a height of a probing mechanism in a vertical direction; and the probing mechanism fixed on the probe adjustment assembly, wherein the probing mechanism comprises:

a sensing assembly; and a probe comprising:

a housing;

a vibrational membrane arranged in the housing, an inner end of the vibrational membrane being attached to an upper end of a stylus holder, and an outer end of the vibrational membrane being fixed to a vibrational membrane connection assembly fixedly connected to the housing;

a stylus holder arranged in the housing;

a stylus arranged in the housing and fixed to a lower end of the stylus holder;

a vertical guide assembly arranged in the housing, the vertical guide assembly being fixed inside the housing, slidably connected to the stylus holder, and configured to guide the stylus holder to move in a vertical direction; and a guide adjustment assembly arranged in the housing, the guide adjustment assembly being mounted on the vertical guide assembly and configured to adjust a sliding friction force between the vertical guide assembly and the stylus holder; and wherein a part of the sensing assembly is fixed to the probe adjustment assembly and is configured to measure displacement of the stylus.

8. The surface texture measurement apparatus of claim 7, wherein the movement mechanism is a Y-axis driving assembly comprising:

a Y-axis motor fixed on the base plate;

a Y-axis ball screw horizontally arranged along a Y axis and rotatably connected to the base plate, wherein an output shaft of the Y-axis motor is fixedly connected to one end of the Y-axis ball screw; and a Y-axis sliding block sleeved threadedly on the Y-axis ball screw.

9. The surface texture measurement apparatus of claim 8, wherein the adjustment mechanism further comprises a specimen adjustment assembly being a Z1-axis adjustment assembly, the Z1-axis adjustment assembly comprises:

a Z1-axis housing fixed on the Y-axis sliding block;

a wedge block arranged in the Z1-axis housing and comprising an upper edge which is a first inclined edge and a lower edge which is slidably connected to the Z1-axis housing, wherein the stage is provided at a lower end thereof with a second inclined edge matched with and slidably connected with the first inclined edge; and a Z1-axis motor arranged at one end of the wedge block and configured to push the wedge block to move horizontally.

10. The surface texture measurement apparatus of claim 9, wherein second balls are respectively rollably provided between the first inclined edge and the second inclined edge and between the lower edge of the wedge block and the Z1-axis housing.

11. The surface texture measurement apparatus of claim 7, wherein the probe adjustment assembly comprises a Z2-axis adjustment assembly which comprises:

a Z2-axis fixing plate fixed on the kinematic bridge;

a Z2-axis sliding plate sleeved threadedly on a Z2-axis adjustment screw; and the Z2-axis adjustment screw rotatably connected to the Z2-axis fixing plate, wherein the housing and the sensing assembly are fixed on the Z2-axis sliding plate.

12. The surface texture measurement apparatus of claim 11, wherein the probe adjustment assembly further comprises a Z3-axis adjustment assembly which comprises:

a Z3-axis fixing plate fixedly connected to an upper portion of the Z2-axis sliding plate;

a Z3-axis sliding plate slidably connected to the Z3-axis fixing plate; and a micrometer fixed to the Z3-axis sliding plate;

wherein an adjusting block extends out of the Z3-axis fixing plate, an end of the micrometer is abutted on the adjusting block, the part of the sensing assembly is fixed on the Z3-axis sliding plate, and the housing is fixed to a lower portion of the Z2-axis sliding plate.

13. The surface texture measuring apparatus of claim 12, wherein the Z3-axis adjustment assembly further comprises a vertical guide plate having a part which is fixedly connected to the Z3-axis fixing plate via threaded holes and screws and an another part which is provided with a vertical elongated hole, a Z3-axis adjustment threaded hole is provided on one side of the Z3-axis sliding plate and provided with a vertical guide screw capable of sliding in the vertical elongated hole.

14. The surface texture measurement apparatus of claim 12, wherein the Z3-axis adjustment assembly further comprises:
   a first sliding bar fixedly connected to the Z3-axis fixing plate;
   a second sliding bar fixedly connected to the Z3-axis sliding plate; and
   a spring each with an upper end fixed to an upper end of the Z3-axis sliding plate and a lower end fixed to a lower end of the Z3-axis fixing plate;
   second V grooves are provided between a side wall of the first sliding bar and a side wall of the second sliding bar facing the side wall of the first sliding bar, third balls are provided in the second V grooves, evenly embedded on and capable of rolling with respect to a ball holder, and rollably connected to the first sliding bar and the second sliding bar.

15. The surface texture measurement apparatus of claim 12, wherein the sensing assembly comprises:
   a sensing plate fixed to the upper end of the stylus support; and
   a displacement sensor fixed on the Z3-axis sliding plate via a sensor holder and configured to measure displacement of the sensing plate, vertical axes of the sensing plate, the stylus holder and the stylus are collinear.

16. The surface texture measurement apparatus of claim 12, wherein the Z3-axis fixing plate is fixed on an upper portion of an adapter plate, the housing is fixed on a lower portion of the adapter plate, and the adapter plate is fixed on the Z2-axis sliding plate.

17. The surface texture measurement apparatus of claim 15, further comprising a controller communicated with a computer and configured to send a control signal to the movement mechanism, the controller comprises a signal processor configured to receive and process a displacement signal sensed by the displacement sensor.

18. The surface texture measurement apparatus of claim 7, wherein the frame comprises:
   the base plate;
   two wing blocks symmetrically arranged on both sides of one end of the kinematic bridge and fixed on the base plate; and
   the kinematic bridge, wherein ball grooves are provided on lower portions of the two wing blocks and a lower portion of an another end of the kinematic bridge, three third balls are mounted on the base plate and assembled in and in point contact with the ball grooves separately; and the kinematic bridge is provided with a groove in which the probe adjustment assembly is fixedly arranged via threaded holes.

19. The surface texture measurement apparatus of claim 7, wherein the vibrational membrane is annular in shape, an inner edge of the vibrational membrane is bonded to the upper end of the stylus holder with epoxy resin, and an outer edge of the vibrational membrane is fixed to the vibrational membrane connection assembly; the vibrational membrane connection assembly comprises a vibrational membrane holder fixed on a top of the housing and an vibration isolation ring fixed on the vibrational membrane holder via threaded holes and screws, the outer edge of the vibrational membrane is fixed on the vibration isolation ring.

20. The surface texture measurement apparatus of claim 7, wherein the vertical guide assembly comprises:
   at least two V-groove blocks equally spaced around a periphery of the stylus holder; and
   a vertical guide bracket having wings extending vertically downward and matching spaces between adjacent V-groove blocks;
   wherein the stylus holder is provided with first V grooves along the vertical direction at positions of the stylus holder opposite to the at least two V-groove blocks, a plurality of first balls are respectively rollably provided between the at least two V-groove blocks and the first V grooves; lower ends of the at least two V-groove blocks are provided with stops configured to prevent the plurality of first balls from sliding out of the first V grooves; and the guide adjustment assembly is mounted above the vertical guide bracket and is configured to move the at least two V-groove blocks away from or close to the stylus holder.

\* \* \* \* \*